March 8, 1960     E. WILDHABER     2,927,510

METHOD AND MACHINE FOR PRODUCING TOOTHED COUPLINGS

Filed May 7, 1956     5 Sheets-Sheet 1

INVENTOR.
ERNEST WILDHABER

INVENTOR.
ERNEST WILDHABER
BY
ATTORNEY

INVENTOR.
ERNEST WILDHABER

March 8, 1960 E. WILDHABER 2,927,510
METHOD AND MACHINE FOR PRODUCING TOOTHED COUPLINGS
Filed May 7, 1956 5 Sheets-Sheet 4

INVENTOR.
ERNEST WILDHABER
BY
ATTORNEY

March 8, 1960  E. WILDHABER  2,927,510
METHOD AND MACHINE FOR PRODUCING TOOTHED COUPLINGS
Filed May 7, 1956  5 Sheets-Sheet 5

INVENTOR.
ERNEST WILDHABER
BY
ATTORNEY

# United States Patent Office 2,927,510
Patented Mar. 8, 1960

2,927,510
METHOD AND MACHINE FOR PRODUCING TOOTHED COUPLINGS

Ernest Wildhaber, Rochester, N.Y.

Application May 7, 1956, Serial No. 582,961

17 Claims. (Cl. 90—4)

The present invention relates to toothed couplings and more particularly to toothed couplings comprising an internally toothed member and an intermeshing externally toothed member. In a more specific aspect, the invention relates to toothed couplings in which the internally toothed member has straight teeth and engages an externally toothed member whose teeth are crowned lengthwise. More especially the invention relates to toothed couplings having teeth of strongly curved profile.

It has long been recognized that in a toothed coupling comprising an internal member and an external member, the teeth of the external member should be crowned to obtain smoother action at shaft angularity, and to reduce the backlash required between the teeth of the intermeshing members. In a paper No. 47–SA2 entitled "Semi Universal Toothed Couplings" presented by me before the American Society of Mechanical Engineers in June 1947, I have analyzed the action of couplings having plane tooth surfaces and tooth surfaces moderately curved in planes perpendicular to the coupling axis, and have shown how the different teeth of such couplings tend to transmit different motion. The transmitted motion changes from a smooth motion at small shaft angularities to a rough motion at large shaft angularities.

One object of the present invention is to put the tooth shape on an exact basis.

Another object of the invention is to eliminate existing inaccuracies in couplings of the character described, and to provide a true shape for the teeth of such couplings.

Another object of the invention is to provide toothed couplings having tooth surfaces that will transmit true uniform motion at different shaft angularities.

Another object of the invention is to remove the limitations heretofore applying to toothed couplings and to broaden their range.

Other objects of the invention are to provide a toothed coupling of increased strength, and a toothed coupling that will operate at larger shaft angularities.

Another object of the invention is to provide a toothed coupling having stronger teeth, and in which the undercut at the tooth ends of the external coupling member will be reduced especially on coarse-pitch members such as required for ample shaft angularities.

Further objects of the invention are to provide a method and tools for making couplings of the character described.

A still further object of the invention is to provide a method for making toothed couplings which will permit tailoring of such couplings so that different shapes may be provided when the coupling has to run about equally at all angles within a given range, and when a coupling ordinarily runs at a very small shaft angularity and has to take the maximum range only occasionally.

Other objects of the invention will be apparent hereinafter from the specification and from the recital of the appended claims.

In the drawings:

Fig. 22 is a fragmentary diagrammatic view, similar to

Fig. 21, showing the method of hobbing the opposite side of the teeth of the external coupling member according to this invention;

The present invention relates chiefly to coupling members having teeth of curved profile and particularly of involute profile. I have discovered that in a coupling comprising an internal and an external member true uniform motion can be transmitted with the proper form of teeth even at substantial shaft angularities provided that the toothed profiles are strongly curved. The toothed surfaces required on the external member differ from surfaces of revolution and are best obtained by generation with a rotary tool such as a hob, shaving tool, or a threaded grinding member, whose turning motion is timed to the rotation of the work. Existing hobbing and shaving processes for the crowned externally toothed coupling member, however, do not provide the exact required shape as will be shown. The invention defines exact shapes that transmit true uniform motion, and provides a method and means for achieving these shapes.

The couplings, to which the present invention relates, may be used either in pairs, or singly. Each comprises an internal member and an external member, such as the members 30 and 32 of Fig. 1. The internal member 30 has straight teeth 31; and the external member 32 has crowned teeth 33.

Figure 1:
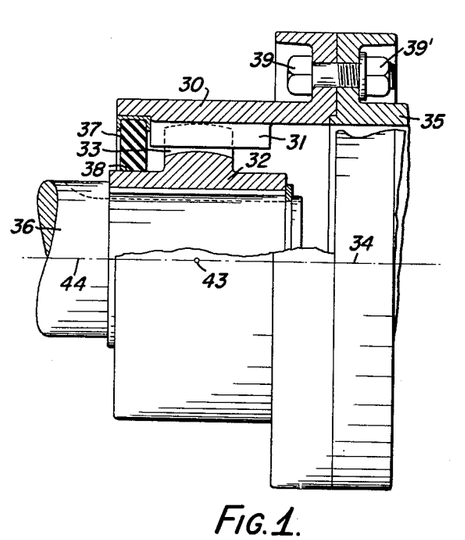
Fig. 1 is a part axial section, part side view of a coupling made according to one embodiment of this invention.

The coupling illustrated in Fig. 1 is for moderate shaft angularities. The teeth 31 extend parallel to the axis 34 of the internal member 30. This internal member is rigidly secured, as by means of bolts 39 and nuts 39', to a part 35. Part 35 may be another internal member similar to member 30, or it may be rigid with a shaft or the like. The external member 32 is rigidly secured to a shaft 36. A seal 37, which is inserted in and secured to the outer end of the member 30 and which cooperates with a cylindrical surface 38 of the external member 32, serves to seal a lubricant around the coupling teeth.

Figures 2, 3:
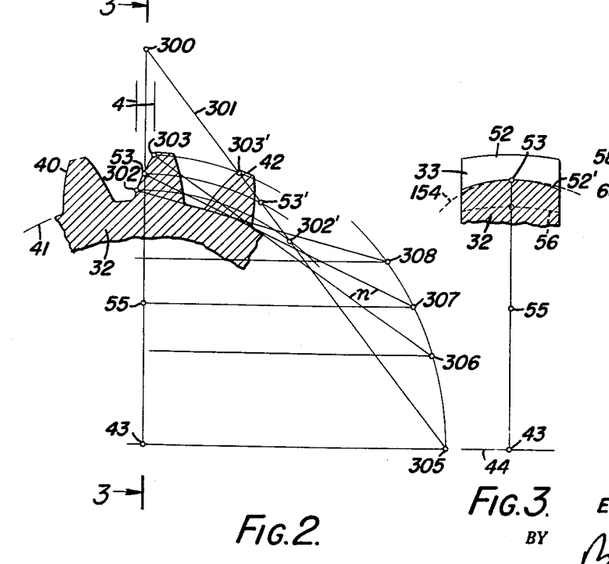
Fig. 2 is a fragmentary transverse section of the external member of this toothed coupling, and showing diagrammatically, also, the basis of certain structural features of the teeth.
Fig. 3 is a section on the line 3—3 of Fig. 2.

The profiles of the teeth 31 and 33 of the two coupling members are sharply curved, and are preferably involutes. The profile shape of the external member is shown in Fig. 2, which is a mid-section through it. The profiles 40 of the teeth of this member are involutes having a base circle 41. The tooth tops 42, preferably lie in a spherical surface centered at 43 (Fig. 5) on the axis 44 of the member 32; and if desired, the tooth tops 42 of the external member may bear for centering against the cylindrical root surface 46 (Fig. 5) of the internal member 30. To avoid sharp corners at the roots of the teeth 31 of the internal member, and yet avoid interference, the tooth surfaces 47 of this member may be joined to its root surface 46 by rounded fillet portions 51.

Fig. 3 shows how the tooth surfaces 52 of member 32 are curved lengthwise at its mean point 53 (Fig. 2). The curvature radius of the sectional longitudinal profile 52' of a tooth surface 52 at point 53 is swung about a center 55 intermediate the tooth surface 52 and the axis 44, while the lengthwise shape of the tooth bottom 56 is preferably centered at 43 on the axis 44. In other words, the tooth tops 42 and the tooth bottoms 56 are concentric, while the sectional longitudinal profile 52', intermediate the tops and bottom of the teeth, is eccentric of the tops and bottoms of the teeth.

How this tooth shape can be achieved will be shown hereinafter. It will also be shown how the pressure angle or profile inclination changes along the teeth 33 and becomes smaller at both ends, and how the potential working surface of the crowned member terminates at a base line 58 (Fig. 4) which is concavely curved and is turned up at both ends 60 and 61 of the teeth.

Figure 4:
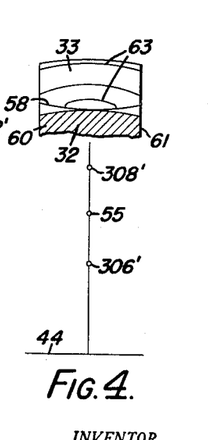
Fig. 4 is a combined sectional view showing, superimposed on one another, sections taken in the parallel planes 4 of Fig. 2.

Fig. 4 illustrates the shape of a tooth surface by its longitudinal section lines 63 taken in the parallel planes 4 in Fig. 2. The tooth surface differs from a surface of revolution in which the base line 58 would follow the tooth bottom.

Figure 5:
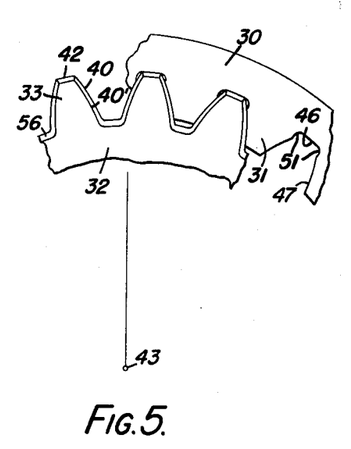
Fig. 5 is a fragmentary end view of a coupling such as shown in Figs. 1 to 4 inclusive.

The change of pressure angle, or profile inclination, along the teeth is illustrated in the end view of Fig. 5. The end top to bottom profiles 40' of the teeth are inclined somewhat to the central profile 49 and tend to be more undercut. The tendency of undercut at the tooth ends becomes more pronounced when a coarser pitch is used than now customary, to increase the strength of the coupling. It is further accentuated when the tooth bottom has a curvature center such as 55 (Fig. 2), as in many existing couplings. It is mitigated when the tooth bottoms 56 are less curved lengthwise than the mid-height lengthwise curvature 52', in accordance with the present invention.

Figure 6:
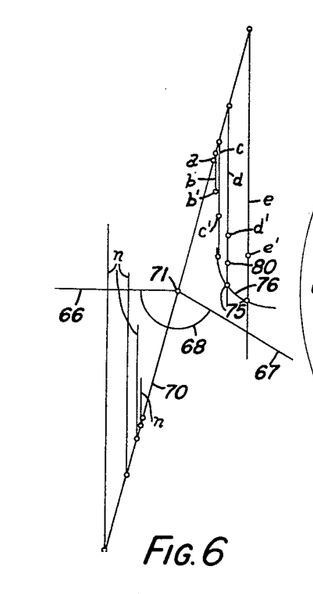
Figs. 6 to 9 inclusive are diagrammatic views illustrating the mesh of the members of a coupling constructed according to this invention where the coupling has fixed shaft angularity, Fig. 6 being a view taken at right angles to the axes of the two coupling members, Fig. 7 being an end view of the internal member, Fig. 8 being a view along the axis of the external member, and Fig. 9 being a view similar to that of Fig. 6 except for its position, and further showing the developed toothed shape.

Let us take a fixed angle coupling and consider the surface of action between an internal coupling member 64 (Fig. 7) having longitudinally straight teeth 65 and its axis at 66, and an external member 69 having teeth 72 (Fig. 9) conjugate thereto and having its axis at 67 (Fig. 6).

Kinematically the coupling acts like a gear. There is an instantaneous axis 70 which passes through the intersection point 71 of the axes 66, 67. It bisects their shaft angle 68, because the transmission ratio is 1:1. The line of instantaneous contact between the two coupling members in any one turning position is the projection of the instantaneous axis 70 to a tooth surface, that is, to a side surface of a straight tooth 65. This side surface has a concavely curved top to bottom, or depthwise, profile 65' and engages teeth 72 (Fig. 9) of convex profile. The profiles 65' shown are involutes, having a base circle or base cylinder 73.

The surface of action of involute teeth contains all the straight surface normals that intersect the instantaneous axis. Each normal is a path of contact between the two meshing members, because a normal to an involute tooth surface remains a surface normal at all turning positions of the tooth. It continues to fulfill the condition of contact in all turning positions, once it fulfills that condition in one of the turning positions.

Accordingly, the normals $a$, $b$, $c$, $d$, $e$, $f$ (Fig. 7) are potential contact normals, and define the surface of action. They are tangent to the base cylinder 73 and intersect a plane 74 (Fig. 7), which is tangent to this base cylinder, at points $a'$, $b'$, $c'$, $d'$, $e'$, $f'$. Plane 74 is parallel to the drawing plane of Fig. 6.

Figure 7:
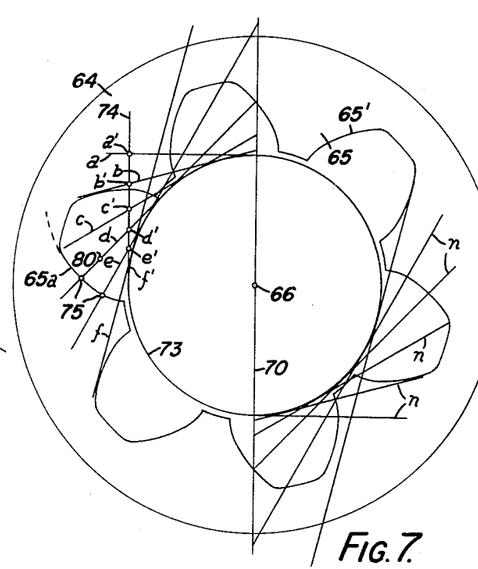
Figure 8:
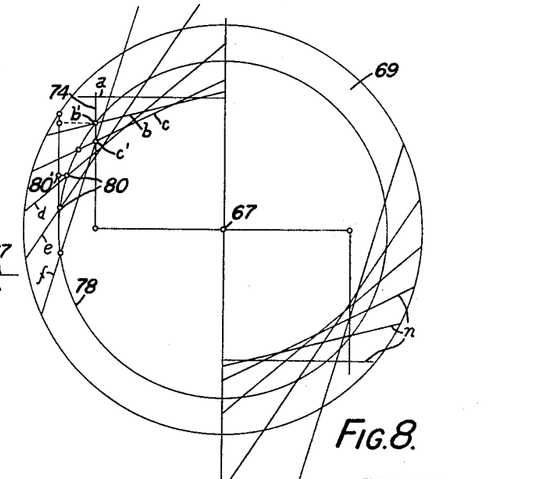
Figure 9:
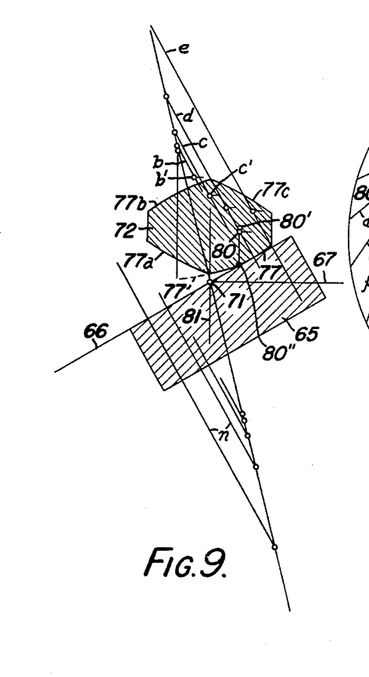

To construct the normals in a view along the axis 67 of the crowned external member, the intersection points $a'$, $b'$, $c'$, $d'$, $e'$ are projected from Fig. 7 to Fig. 6, transferred to Fig. 9, and projected from there to Fig. 8. Also the intersection points of the normals with the instantaneous axis 70 are projected. The normals $a$, $b$, $c$, $d$, $e$, can now be drawn in Fig. 8 as the connecting lines of two such corresponding intersection points.

To construct an instantaneous line of contact with a tooth surface 65a (Fig. 7) at any turning position, the intersection points 75 of the normals $a$, $b$, $c$, $d$, $e$ with said tooth surface are projected from Fig. 7 to Fig. 6. They can also be projected to other views. In this way a curved line 76 (Fig. 6) is obtained as the line of contact.

One way of defining the tooth shape of the external member is to give its intersection line with one or more cylindrical surfaces coaxial with said external member. The intersection line 77 with a mean cylindrical surface 78 (Fig. 8) is shown in Fig. 9 in the development of this cylindrical surface to a plane. It is obtained by first locating the intersection point 80 (Fig. 8) of each normal $a$, $b$, $c$, $d$, $e$ with the cylindrical surface 78, and projecting that intersection point to the normal shown in Fig. 9. From there it can be directly transferred to Fig. 6, which is a view in the same direction, and then projected to Fig. 7. The normal distance of a projection point 80 (Fig. 7) from a reference tooth surface, such as 65a (Fig. 7) indicates the turning angle required to move this point about the axis 66 into the surface 65a. The turning angle is the proportion of said normal distance to the radius of base circle 73 in radian measure.

The same turning angle applies to the external member and to axis 67.

Now we develop the cylindrical surface 78 in a plane, whereby point 80 moves to a position 80' (Figs. 8 and 9). From point 80' we plot a distance 80'—80'' (Fig. 9) which distance represents the aforesaid turning angle measured as an arc on the cylindrical surface 78. Other points 80'' are similarly attained. Sought intersection line 77 with the cylindrical surface 78 is the connecting line of the various points 80''.

Couplings made according to the present invention may take the place of angular gear drives. They differ from angular gear drives, as will be described further hereinafter, by being capable of transmitting pure torque, exerted in two different regions lengthwise of the driving sides of the teeth. A pair of gears meshes only in one zone and transmits only a force; and bearings are needed to hold each gear in place. The coupling of the present invention meshes simultaneously in two diametrically opposite zones; and because the tooth loads are balanced no bearings are needed on one member. The coupling referred to permits some displacement, also, axially of the internal member.

Since there are two regions of mesh located on diametrically opposite sides of the coupling a further intersection line 77a can be determined in like manner for that portion of each external tooth of the coupling which gets into mesh in the other region as the coupling rotates. At one and the same instant, one external coupling tooth 72 is in mesh with an internal coupling tooth 65 along region 77 of this tooth 72, and the diametrically opposite coupling tooth 72 is in mesh with the diametrically opposite internal coupling tooth 65 along region 77a of that diametrically opposite tooth 72. The two lines 77 and 77a are symmetrical with respect to a mid-plane 81 which is perpendicular to the axis 67 of the external member, and which passes through the intersection point 71 of the axes 66, 67. The normals $n$ for the portion 77a of a tooth side are shown in the right hand bottom quadrants of Figs. 7 and 8, and in the lower left hand portions of Figs. 6 and 9. The two branches 77, 77a of a side of a tooth 72 intersect at an angle, and eliminate some of each others potential mesh, the mesh at the dotted portion 77'.

The opposite sides of the teeth 72 have similar lengthwise intersection profiles 77b and 77c. Each side of a tooth 72 comprises two branches 77, 77a, or 77b, 77c which meet at an angle. Also, each side surface of a tooth 72 is composed of two portions meeting in a central ridge.

The lengthwise intersection profiles of the teeth in other cylindrical sections coaxial with axis 67 can be similarly determined, so that the entire tooth shape is known. This is the tooth shape of the external member of a fixed angle coupling, a shape which can be produced in a generating operation with a tool which in operation describes one or more teeth of the internal member.

The lengthwise intersection profiles 77, 77a, 77b, 77c, in a cylindrical section 78 coaxial with the external member are longitudinally convex, and have a varying curvature. The curvature radii increase with increasing distance from the center of the teeth 72, that is, with increasing distance from a mid plane 81 that is perpendicular to the axis 67 of the external member.

Figure 10:
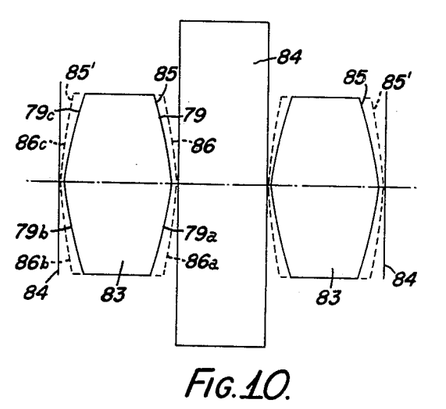
Fig. 10 is a development to a plane of a cylindrical section coaxial with the external member of a fixed angle coupling made according to this invention, and showing, also, a tooth of the meshing internal member.

Fig. 10 shows external coupling teeth 83 with lengthwise profiles 85 consisting of parts 79, 79a, on one side of the teeth, and of parts 79b, 79c on the other sides of the teeth in a developed mean cylindrical surface. They are shown in relation to a longitudinally straight tooth 84 of the mating internal member when the pair of coupling members is set to zero shaft angularity. The teeth then have backlash. The profiles 79 are similar to the profiles 77 of Fig. 9, but are for more moderate fixed shaft angularity.

Dotted lines 85' indicate the profiles of the same cylindrical section, as in Fig. 10, of an external coupling member that will run at a smaller fixed shaft angularity with the same internal member as shown in Fig. 10. The branches 86, 86a of the lengthwise profiles of the teeth of the external coupling member, are less inclined to each other than branches 79, 79a; and their teeth have less backlash when the coupling members are set to zero shaft angularity. The branches 86c, 86d of the lengthwise profiles of the opposite sides of the teeth of this coupling member are also less inclined to each other than the branches 79b, 79c.

Figure 11:
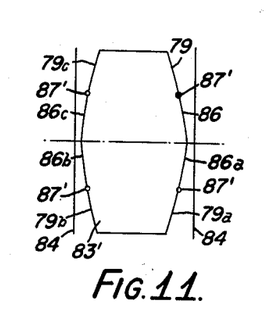
Fig. 11 is a diagrammatic developed view, similar to Fig. 10, showing the combined tooth shape that may be employed on the external member of the coupling so that the coupling may operate at two different shaft angularities.

Fig. 11 shows a combination of the two lengthwise profiles 85 and 85', the profile 85 occupying the outer ends of the teeth 87, and the profile 85' occupying the central portion. The points 87' are the points of junctures of the different lengthwise profile portions. A coupling, such as illustrated in Fig. 11, could run at two shaft angularities that correspond to the profiles 85 and 85', respectively.

Figure 12:
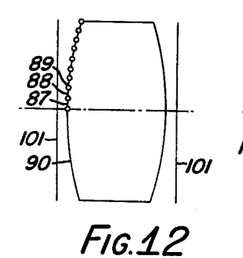
Fig. 12 is a diagrammatic developed view, similar to Fig. 10, showing the shape suitable for all shaft angularities within a given range.

Fig. 12 shows that a great many lengthwise profiles 87, 88, 89, etc. can be combined, each corresponding to a different shaft angularity. The lengthwise profiles so overlap about the axis of the external member that they occupy nearly equal distances on the composite lengthwise profile 90. For each shaft angle within range there is about the same length of lengthwise profile 90. Fig. 12 also shows that the combination of infinitely many lengthwise profiles, each occupying an infinitesimal and approximately equal portion of profile 90, is possible. This composite lengthwise profile is a smooth curve, and approximately a circular arc at the small shaft angularities mostly used.

Figure 13:
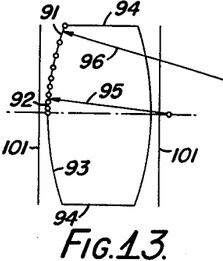
Fig. 13 is a diagrammatic developed view, similar to Fig. 10, showing the shape for the teeth of the external member of another form of universal coupling intended to run about equally at all shaft angularities within its range.

Fig. 13 shows a modified combination of a great many lengthwise profiles, so combined together that the outer portions 91 of the composite lengthwise profile are larger than the more centrally located portions 92. The profile 93 is actually smooth and contains an infinite number of infinitesimal portions 91, 92 increasing in relative length towards the ends 94 of the teeth. The profile 93 has varying curvature. Its central portion has the minimum radius of curvature 95, while the outer portions have gradually increasing radius of curvature 96. With this disposition, the larger shaft angularities are given more bearing surface than the smaller ones to offset the increased amount of tooth sliding and the decreased intimacy of contact.

Figure 14:
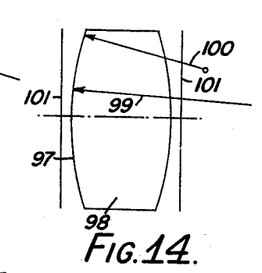
Fig. 14 is a diagrammatic developed view, similar to Figs. 12 and 13, showing a further modification of the invention.

Fig. 14 shows an opposite combination of many lengthwise individual profiles, each corresponding to a different shaft angularity. Here the profile 97 of tooth 98 has its maximum radius of curvature 99 in the central portion while the curvature radius 100 becomes smaller toward the tooth ends. This combination may be used when the coupling runs at small shaft angularities nearly all the time, and only occasionally at the angularity of the design limit.

The teeth shown in Figs. 12 to 14 have the same design limit. The couplings containing such teeth have no backlash at the design limit, but they have increasing backlash the more the shaft angularity differs from the design limit. They are shown at zero shaft angularity in relation to the longitudinally straight tooth sides 101 of the internal member.

The modification shown in Fig. 13 departs least from the lengthwise profile 85 (Fig. 10) that corresponds to the shaft angularity of the design limit. It replaces the sharp corner at the middle of the length of the teeth of the latter with an arc of its minimum curvature radius 95. It also has the least amount of backlash at zero shaft angularity, of the several couplings shown in Figs. 12 to 14.

Figure 15:
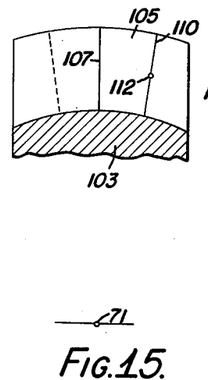
Fig. 15 is a fragmentary axial section, showing a side view of the teeth of the external member of a fixed angle coupling, and showing, also, the lines of instantaneous tooth contact of such a coupling member with a mating internal toothed member having plane tooth sides.
Figure 16:
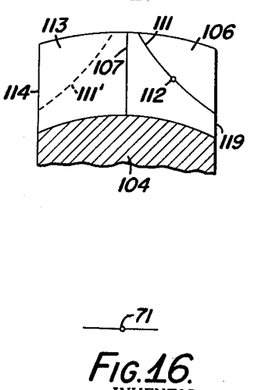
Fig. 16 is a fragmentary axial section, similar to Fig. 15, but showing the lines of contact of the externally toothed member when it is in engagement with an internally toothed member having involute tooth profiles.

Figs. 15 and 16 are each a fragmentary axial section through an external member of a fixed angle coupling. They compare a coupling conjugate to an internal member having plane tooth sides and with a coupling conjugate to an internal member having involute tooth sides.

Both tooth surfaces 105 and 106 have a longitudinally central ridge 107 extending from top to bottom of its teeth. They have, however, differently directed lines of instantaneous contact 110 and 111, respectively, which in the considered turning position pass through a mean point 112. The line of contact 110 of the tooth side of the external member with the meshing plane tooth surface of the mating internal member is a straight line. It is the projection of instantaneous axis to said plane tooth surface.

At each point of the line of contact 110, the external and internal members have a common tangent plane which coincides with the plane tooth side of the internal member and has a constant distance from the intersection point 71 of the axes of the two members. This characteristic of the external member holds for all fixed shaft angularities. The tooth surface of each of the members contains a whole system of straight lines and has a common tangent plane at all points of any one of such straight lines.

When it comes to combining the tooth surfaces corresponding to all shaft angularities within a given range, in the manner described in connection with Figs. 12 to 14 inclusive, in an external coupling member, which is conjugate to an internal coupling member having plane tooth sides, the surface elements join each other tangentially as do the elements of the curves shown in said figures. They join each other along straight lines, such as line 110 (Fig. 15), along which they have a common tangent plane, at a constant distance from intersection point 71. What remains of the tooth surface of a fixed-angle external member on the composite tooth surface is a straight line 110 and a land of infinitesimal width following said line. This line gets into contact simultaneously along its entire length, and thus effects the required 1:1 velocity ratio only for an instant.

Conditions are different with involute teeth and broadly with teeth of ample profile curvature. With involute teeth, the surface of action of every fixed angle coupling is made up of straight lines $a$, $b$, $c$, $d$, $e$ (Figs. 6 to 9), that are normal to the contacting tooth surfaces. These lines intersect a tooth surface at the line of instantaneous contact of said tooth surface, such as line 111 of Fig. 16. It is a line amply inclined to the depthwise direction of the teeth. The straight lines of action have corresponding lines on the tooth surfaces of both members, the locus of the surface points, which successively coincide with the points of a straight line of action. They appear as generally depthwise lines similar to line 110 of Fig. 15, and amply inclined to the instantaneous line of contact 111.

In operation, the line 111 sweeps the tooth surface between the ridge 107 and the tooth end 119. The tooth portion 113 between the ridge 107 and the opposite tooth end 114 is swept by a line 111' when the tooth has rotated to a diametrically opposite region of contact.

When the tooth surfaces corresponding to all shaft angularities within the limit range are combined, the surface elements join each other tangentially on said depthwise lines. These get into contact gradually, so that the uniformity of the motion is preserved.

We can take the developed lengthwise profiles of Figs. 12 to 14 inclusive, erect a plane normal to a lengthwise profile at any of its points, and determine the surface normal at that point, that is, the line of action. It lies in the normal plane and is so inclined to the drawing plane that the aforesaid torque requirement is fulfilled. This can be repeated for the other points.

One way of defining the tooth surface of a gear is by the shape of the tooth surface of its rack. We have already the developed lengthwise profile of a cylindrical section of a gear or coupling member. This is also the pitch line of a rack whose pitch plane rolls on said cylindrical surface. The motion of this rack is in the direction of the gear periphery, that is, in the horizontal direction in the drawing plane of Figs. 12 to 14. The said surface normals are also the lines of action for defining the rack teeth. Each line of action corresponds to a strip of a plane tooth surface of the rack.

All the surface normals at points of a considered developed profile (Figs. 12 to 14) have a constant inclination to the direction of the rack travel so that they fulfill the said kinematic requirement. For this reason, the tooth surface of a basic rack can be considered composed of elements of conical surfaces of constant cone angle, whose axes extend in the direction of rack travel.

Figure 18:
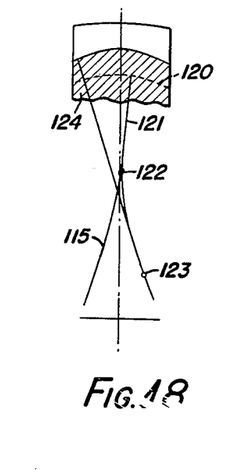
Fig. 18 is an axial section similar to Fig. 3, but showing a tooth of a coupling having a different form of crowning.

It is possible to have a basic rack whose tooth sides are each a single conical surface. The axis of this surface is perpendicular to the drawing plane of, for instance, Fig. 3, and it may be at 55 or at 43, or elsewhere. The tooth surface of the basic rack may also be a composite of an infinite number of conical surfaces, whose parallel axes may lie for instance in a forked curve 115 (Fig. 18). These conical surfaces have a constant cone angle, and axes perpendicular to the drawing plane of Fig. 18.

The mesh of a universal coupling so constructed is along a straight line of action in each mesh region, a line which corresponds to the cone element of the basic rack. To transmit true uniform motion continuously the teeth should be deep enough that the length of each line of action within the boundaries of mating teeth is larger than the normal base pitch. The normal base pitch is the normal distance from one another of adjacent involute tooth surfaces on the same side of the teeth. The above requirement is the same that exists on involute spur gears.

The distribution of curvature in the sectional profiles (Figs. 12 to 14) is generally reflected in the shape of the tooth bottom. Fig. 12 corresponds to a tooth bottom of approximately constant curvature, like tooth bottom 56 of Fig. 3. Fig. 13 corresponds to a tooth bottom 120 more curved at the middle and less curved at the ends, see Fig. 18. At the middle it has a curvature radius 121 and a curvature center 122, while it has a curvature center 123 and a larger curvature radius near the tooth ends.

Figure 17:
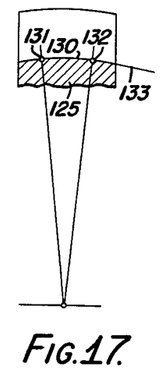
Fig. 17 is a fragmentary axial section of the external member of a universal coupling made according to a modification of the invention and having modified tooth space bottoms.

Fig. 17 indicates a way of reducing the tooth depth at the ends of the teeth. The tooth bottom 130 is rolled out only to the design limit, determined by the shaft angularity desired, between the points 131 and 132. Outwardly of these points the root surface may have a straight profile 133; or it may even have a concave profile if rolled out a little further.

Figure 19:
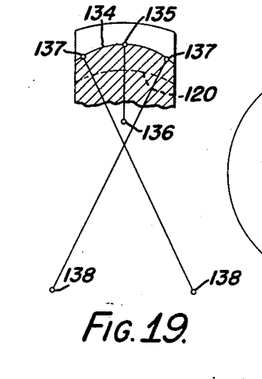
Fig. 19 is an axial section like Fig. 18, further illustrating this form of crowning.

Fig. 19 is a fragmentary axial section like Fig. 18 showing the intersection line 134 between a side tooth surface of the external member of the coupling and a plane which passes through mean point 135 of the working profile and which contains the axis of the coupling member. The crowning obtained in accordance with Fig. 19 is such that line 134 has a varying radius of curvature. The radius of curvature 135—136 is a minimum at the middle of the tooth; and at the end points 137 of the working length of the teeth, the radius of curvature 137—138 is at least 50% greater than at the middle. Curved line 134 is more crowned than the tooth bottom 120, and comes nearer to the tooth bottom 120 at the tooth ends. It has a smaller curvature radius than an axial section of the tooth bottom. The side surface of the tooth along intersection line 134 is correspondingly curved.

Production

Figure 20:
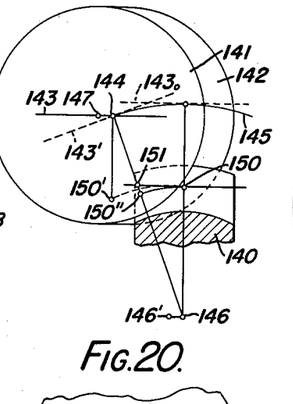
Fig. 20 is a diagrammatic view illustrating one way of hobbing the teeth of an external coupling member and illustrating the inaccuracies which occur in the conventional method of hobbing such teeth.

Fig. 20 illustrates diagrammatically cutting of an external coupling member 140 by a threaded tool member, such as a hob 141, which is indicated diagrammatically by its outside surface 142. The hob has an axis 143 whose central point 144 may move in a circle 145 about an axis 146. The position of the latter defines the crowning of the teeth of the coupling member. In conventional production the hob axis 143 remains parallel to itself in all feed positions and parallel to the position $143_0$ at the middle. It performs a circular translation relative to member 140. This is different from a turning motion about axis 146, which would place the hob axis in the dotted position 143' at a constant distance from the axis 146.

In the bodily motion of the hob 141, only the central point 144 and points projected into this point move about the axis 146. All other points of the hob move about other axes, thus point 147 of the hob axis moves about an axis 146' in an arc of the same radius as radius 144—146. The point of the hob, that coincides with mean pitch point 150 in the middle position, is at 150' in the hob position shown, and arc 150—150' has also a radius equal to radius 144—146.

This circular translatory motion affects the shape of the tooth surfaces produced. It can be demonstrated mathematically in a lengthy way that the produced tooth surfaces are not exactly symmetrical lengthwise to a central plane (43—53 in Fig. 3), perpendicular to the axis 44 of the external member. Instead of a symmetrical lengthwise sectional profile 52' (Fig. 3) an unsymmetrical lengthwise profile is obtained, as shown exaggerted in dash lines at 154 in Fig. 3. This lengthwise profile has the same curvature as lengthwise profile 52' at mean point 53, but departs from profile 52' in opposite directions at the two sides.

This departure increases sharply with increased crowning, that is, with increasing design limits of the shaft angularity. It also increases with increasing lead angle of the hob, to which the hob is set. It is negligible on fine-pitch couplings for small shaft angularities, produced by single threaded hobs. On these, the concave curvature of the base line 58 (Fig. 4) is not discernable.

It is obvious that a symmetrical tooth form is preferable to an unsymmetrical one. Lack of symmetry disturbs the mesh and tends to throw the external member off center. Also, when it is desired to maintain concentricity of the coupling members by contact of the top surfaces of the crowned teeth of the external member with the tooth bottoms of the straight teeth of the internal member, the load may be carried in one region instead of in two diametrically opposite regions. This stresses the teeth and the guide surfaces unduly.

Even if the threaded member 141 is turned about axis 146, and its turning axis is moved from a position 143' to $143_0$ and beyond, there is still a departure from exactly symmetrical teeth, at least in principle. It might be supposed that the line of action between the hob thread and the final tooth surfaces of the external member intersects the drawing plane at a point 150'' at the same distance from axis 146 as mean point 150; but that is not so. A force acting along the line of action through point 150 exerts turning moments on the hob and external member in the proportion of the numbers of their respective threads and teeth. If in the feed position shown, the line of action would remain equally positioned with respect to axis 146 and pass through point 150'', the said force acting along it would exert the same turning moment as before on the hob, but a smaller turning moment on the external member. This is because point 150'' has a smaller distance from the turning axis of the external member than point 150. Accordingly, the above proportion would not be attained. If the line of action were passed through point 151, the said turning moment would be the same as in the central position on the external member; but the turning moment exerted on the hob would be smaller, because of the decreased distance of point 151 from the hob axis 143'. Accordingly, the line of action passes through neither point 150'' nor point 151.

It can be shown that the lines of action of opposite tooth sides intersect the drawing plane at two different points, and that the tooth surfaces obtained are not quite symmetrical with respect to a mid-plane perpendicular to the turning axis. There are, therefore, two sources of error. One is the circular translation of the hob. The other is the helical nature of the threads. The latter error is negligibly small where the customary single thread hobs are used. It has, however, some effect with shaving tools that have multiple threads or teeth.

Unlike hobs, shaving tools are not positively timed to rotate in time with the work during operation; the timing is dependent upon the engagement of the shaving tool and of the work piece. The turning position of a shaving tool is adapted to the tooth shape already existing on the workpiece. For this reason, only a fraction of the error which would result, if the shaving tool were embodied as a hob, becomes effective in shaving. If a shaving tool is moved for instance about axis 146, so that its axis moves from 143' to $143_0$ and beyond, while its central point 144 describes the circular arc 145, the chip thickness may vary, depending on its number of teeth and its diameter. A shaving tool, which will just contact both sides of the crowned teeth of the work in the middle position, may be clear of the work near the end positions.

To keep the shaving tool in contact with both sides of the teeth its depthwise position may have to be changed near the tooth ends. In other words, the feed path should be modified. At the center the required feed path has the same curvature as arc 145. At the ends it should then be differently curved. Instead of being an arc of a circle, the feed path is then more nearly a portion of an ellipse.

A relative feed motion about an axis 146, as described, can also be attained by tilting the workpiece about axis 146. In addition to this turning motion, the tool and workpiece are moved depthwise relatively to one another near the ends of the feed path. When this is done, a constant depth of shaving cut is attainable also on couplings for ample shaft angularities. The shape of the feed path required is the same as the path of a shaving tool that remains in contact with both sides of the crowned teeth. It can be determined in the shop; it can also be computed. A true turning motion about axis 146 is readily attainable with shaving tools because of the absence of outside timing.

Several ways of avoiding the errors above described will now be disclosed.

Figure 21:
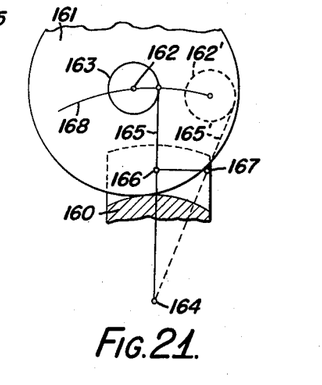
Fig. 21 is a fragmentary axial section diagrammatically illustrating a way of hobbing one side of the teeth of an external coupling member according to this invention.
Figure 22:
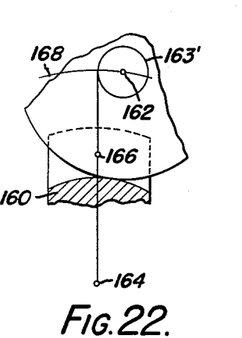
Figure 23:
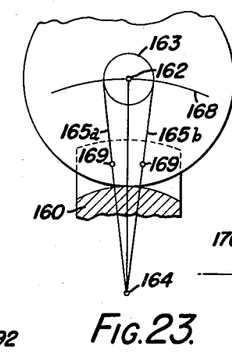
Fig. 23 is a diagrammatic view, similar to Figs. 21 and 22, and illustrating a method of hobbing simultaneously both sides of the teeth of an external coupling member according to this invention.

Both errors may be avoided in accordance with my invention by setting the hob square, that is, so that its axis is parallel to the axis about which it is fed. This is indicated in Figs. 21 to 23. In Figs. 21 and 22, the two sides of the teeth are considered separately. The workpiece 160 is cut with a hob diagrammatically shown at 161 having an axis 162. The hob has an involute helical thread whose base cylinder is denoted at 163. In operation, it is fed about an axis 164 parallel to the hob axis 162 and perpendicular to the direction of the work axis.

If the lines of action in the central plane 165 are to intersect the drawing plane at a pitch point 166, then the lead of the hob, or its axial pitch, should be equal to the circular pitch of the coupling member at the pitch radius 164—166. Its thread inclination in a plane 165 parallel to the hob axis should be equal to the pressure angle at that point; and its thread should be somewhat thinned up as compared to conventional hobs.

As the hob axis is fed in a circular path 168 about axis 164, the hob is moved as if rigid with a part rotatable on axis 164. A turning angle 166—164—167 is added to the hob rotation, this turning angle being the angle between the projected lines of action 165, 165'. In this way the above errors are avoided and symmetrical tooth surfaces are attained.

The line of action 165' intersects the drawing plane at a point 167 at the same distance from the work axis at point 166 has. It is inclined at the same angle to the drawing plane as line 165.

On the other side of the teeth (Fig. 22) the base cylinder 163' of the hob lies on the opposite side of the projected line of action. The hob axis describes however the same circle 168.

Fig. 23 shows how both sides of the teeth may be simultaneously cut. On one side of the teeth, the finishing action is along a line 165a and on the opposite side along the line 165b. Both lines intersect the axis 164 and are tangent to the base cylinder 163 on opposite sides. The lines of action intersect the drawing plane in spaced points 169.

The added turning angle of the hob required is the angle described by axis 162 on circle 168, and is proportional to the arc described on that circle. At the moderate shaft angularities mostly used, it may be made proportional to the feed component extending along the work axis. In other words the sine of the angle may be substituted for the arc at small angles. This can be done with the differential ordinarily used on hobbing machines for cutting helical teeth.

A hob 161 so set and fed about axis 164 with proper change of the timing produces tooth sides that are conjugate to a conical rack-tooth surface whose axis coincides with axis 164. Other shapes may be similarly obtained.

Figure 24:
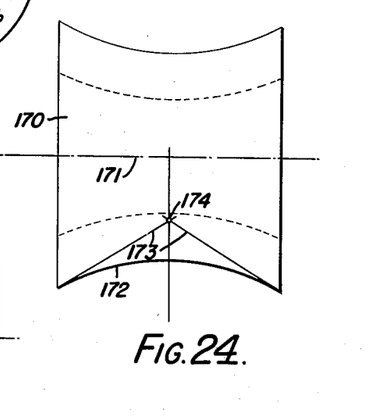
Fig. 24 is a side view illustrating diagrammatically the construction of one form of hob such as may be used in cutting an external coupling member according to this invention.

Tooth bottoms of less curvature can be produced by using a larger generating pressure angle on the hob while preserving the pressure angle on the coupling. Thus, the lines of action, or lines of finishing contact, 173 (Fig. 24) may intersect or appear to intersect at a point 174 further out on the coupling member and further in on the hob than the mean point. The problem then is to reach as much of the line of action as needed at the outer ends. This may be accomplished with the hob 170 that has a concave top surface 172. The axis of this hob is at 171.

Figure 25:
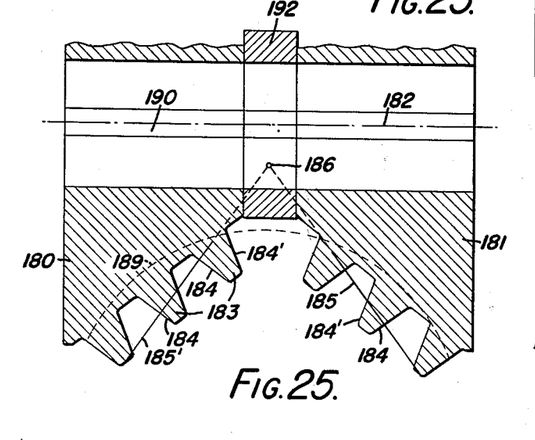
Fig. 25 is a fragmentary axial section through a pair of taper hobs or threaded grinding members such as may be employed in cutting or grinding toothed couplings according to this invention.

We may go further with the inclination of the lines of action by using taper hobs, or tapered threaded grinding members. A tool of this type is shown in Fig. 25. It consists of a pair of hobs or grinding members 180, 181 separated by a spacer 192 and rigidly secured together. The cutting portions of the two members 180, 181 are arranged in threads 183, a single thread being preferably used. Only one side of each hob thread serves for finishing, the side 184 that faces the hob end. It is the convex side of the hob thread. The opposite side 184' does not get into finishing contact. The hob threads have a constant pitch. In principle, they are involute helicoids, and have a straight profile in a plane tangent to the base cylinder of the helicoid. Like conventional hobs they can also be provided with straight profiles in axial planes.

The pair of hobs finish along lines of action 185, 185' that appear to intersect at a point 186 which is way outside the coupling member being cut. The two hobs 180, 181 are adjustable relative to each other along their axis 182 by changing the spacer 192.

The pair of hobs may be sharpened by regrinding their gashes individually, or by providing common circular gashes, and regrinding these in one operation. The bottom of a common circular gash is denoted at 189 in Fig. 25. It has a plane side serving as the cutting faces of the hob teeth extending along the gash.

Figures 26, 27, 28, 29, 30:
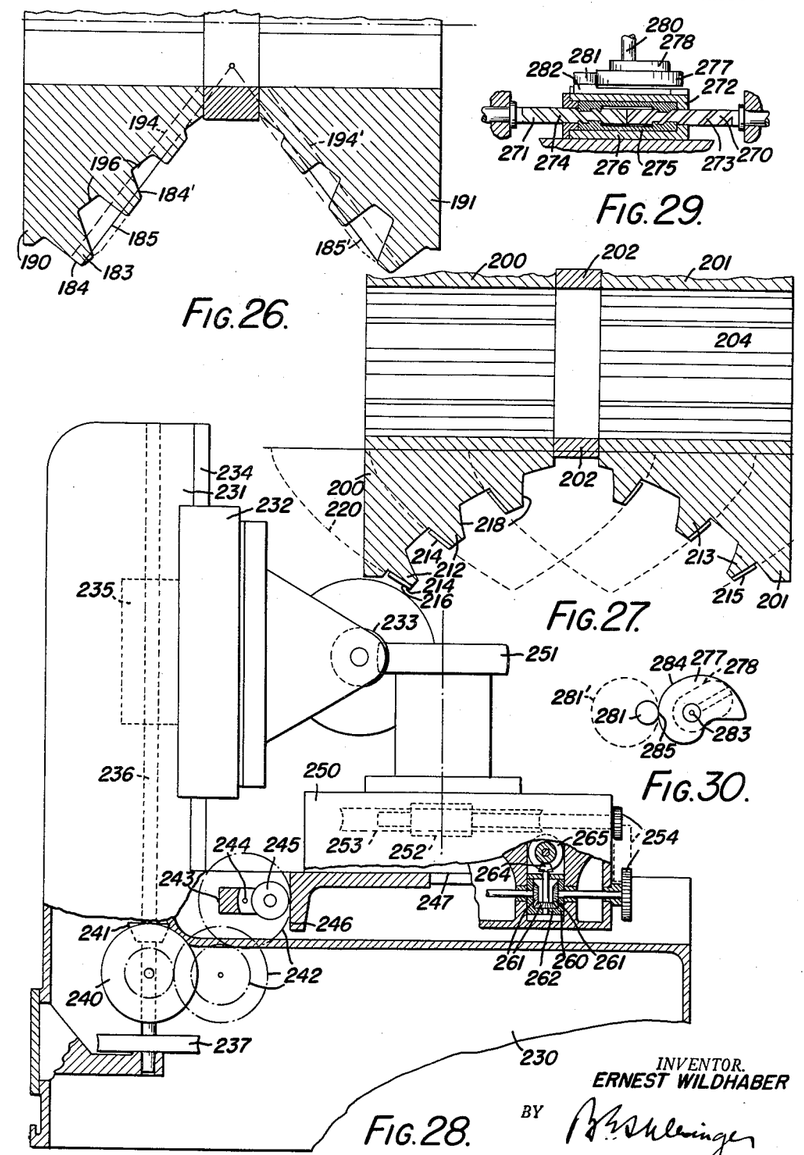
Fig. 26 is a similar axial section through a modified pair of tapered hobs constructed according to the invention.
Fig. 27 is a similar fragmentary axial section of a pair of shaving tools constructed according to the invention for use in shaving the teeth of an externally toothed coupling member.
Fig. 28 is a part side view, part axial section, of a hobbing machine built according to this invention for cutting the external coupling member, the view being more or less diagrammatic.
Fig. 29 is a part elevation, part section, of a detail of a mechanism which may be substituted for the differential 260 in the machine of Fig. 28.
Fig. 30 is a detail view of the cam and abutting roller of the machine of Fig. 29.

A modified hob structure is shown in Fig. 26. The pair of taper hobs 190, 191 has cutting edges arranged in the same thread 183 as the hobs 180, 181; but the thread tops are partly cut off in a direction along the lines of action 185, 185'. Straight hob gashes are provided whose bottoms 194, 194' also extend in the general direction of the respective lines of action 185, 185'. The gashes may contain plane cutting faces passing through the hob axis or parallel thereto. With the shown construction, the gashes do not need to be as deep as the full thread, but can be made much shallower. This permits many more gashes and more cutting edges to be provided so that the profile, which is generated on the work, is composed of more facets and is smoother. This is important especially on coarse pitches.

If desired, the thread bottoms may extend in the direction of the line 194.

Since the cutting, and especially the finishing, is done only on the outer sides 184 of the thread and not on the inner sides 184', the cutting edges of only the side 184 need be relieved. However, the remainder of the thread of that side should not stand out beyond the cutting edges. It should either stand back of them or be flush with them.

If desired, the hob body is made up of a hob body proper and of a conical sleeve brazed or welded to it after the hob body has been threaded. The inside surface of this sleeve extends along the line 194 or 194'. The sleeve is then threaded so that its thread side 184 stands out over the thread of the hob body proper, and the hob is then relieved on that side. In this way, the continuous thread of the hob body proper stands back from the cutting edges at all stages of the hob life.

The taper hobs, and other hobs shown, may be used with their axes set perpendicular to the plane of the relative feed movement, or they may be with their axes inclined at another angle thereto. According to my invention it is possible to produce exactly symmetrical teeth in the latter case by adding to the feed motion. The motion added causes the working portions of the tool member to approach toward one side of the teeth during part of the feed motion, and to approach toward the other side of the teeth during another part of the feed motion. The tool member is moved away from the side where it tends to take off too much stock, and is moved toward the opposite side, where it tends to leave too much stock.

The added motion is preferably a slight and varying change of hob timing. It could also be an axial displacement of the hob at a varying rate. Structure for changing the hob timing will be described hereafter.

Obviously, instead of applying the added turning motion to the hob, a proportional turning motion can be applied to the workpiece.

How the use of taper hobs affects the lengthwise crowning of the teeth will now be described with reference to Figs. 2 to 4 inclusive. Only one side of the teeth is discussed, since the opposite side is symmetrical thereto. 300 is the point of intersection of the line of action 301 with the axial plane 43—53 of the coupling member. It is also the point of apparent intersection of the lines of action of opposite sides. It corresponds to point 186 of the line of action 185 of Fig. 25.

Spherical tooth bottoms 56 centered at 43 are produced by feeding the hob pair about an axis 43 (Fig. 3) that coincides with line 43—305 in Fig. 2. The points 302, 53, 303 (Fig. 2) of the depthwise tooth profile 40 are then generated in positions 302', 53', 303' on the line of action 301. N are the normals to the depthwise tooth profile 40 at points 302, 53, 303. The tooth surface at these points is curved about the axis of hob feed with a curvature center 305 in a normal section 300—305 perpendicular to the drawing plane 302 of Fig. 2.

When the points 302', 53', 303', with their normal 301, are turned back to their original position 302, 53, 303, the curvature center 305 moves to positions 308, 307, 306, respectively.

The curvature centers in the sectional planes 4 (Fig. 2) parallel to the axial plane 43—53 are known to be the projections to said sectional planes of the curvature centers 308, 307, 306 of the normal section. In other words, the curvature centers 306', 55, 308' shown in Fig. 4 are the projections of the points 308, 307, 306. It is seen that in this way the tooth surfaces can be more crowned, and the lengthwise profile 52' (Fig. 3) can be more curved than the tooth bottom 56.

Fig. 27 illustrates a tool member which is composed of a pair of oppositely tapered shaving tools 200, 201 separated by a spacer 202. As in the case of taper hobs, it is also desirable in the case of the shaving tools to provide relative adjustment along and about the axis of rotation, to adapt the unit to a range of jobs. A pair of shaving tools may be secured to a splined spindle whose splines engage splines 204 provided internally on the tools. The number of splines differs from the number of threads or teeth on a shaving tool and may be prime thereto. This permits a relative turning adjustment. The tools have threads or teeth 212, 213, respectively. Only the distal sides of the threads or teeth contain serrated working surfaces, that is, the sides 214 of the thread 212 and the sides 215 of the thread 213. These are the longitudinally convex sides of the threads 14. The opposite sides 218 do no work, and may have any shape so long as they do not interfere.

Many phases of the invention can be practiced on existing machines. Variation of tooth curvature, however, is not obtainable on conventional hobbing machines of conventional construction.

In Fig. 28 I have shown a hobbing machine suited for all phases of hobbing the external coupling member. 230 denotes the base or frame of this machine; and 231 is an upright or column mounted on the base. 232 designates a slide on which the hob 233 is mounted. This slide is vertically movable on guides 234. The hob slide has a nut 235 engaged by a feed screw 236. The shaft of this screw is driven through a worm gear 237 from any suitable source of power. This shaft carries a bevel pinion 241 which is rigid with the shaft. Pinion 241 drives a cam shaft or swinging part 243 through a bevel gear 240 and change gears 242 indicated by their pitch circles only. The cam shaft or part 243 turns about an axis 244 in direct and adjustable proportion to the motion of the feed screw 236.

The shaft or part 243 carries either a cam or an eccentric or roller 245 whose eccentricity may be adjustable if desired. The cam or roller acts against an abutment 246 here shown as having a plane abutting side. This abutment is adjustable along guides 247 on the work slide 250. The work slide, together with the abutment 246 and work piece 251, is pressed toward the cam or roller 245 by hydraulic pressure through means not shown.

In operation, as the hob slide is fed along the guides 234 by the screw 236, the part 243 is turned in proportion thereto, to make a fraction of a turn per cutting cycle. Thereby, the work slide and the work piece move closer to the hob axis on both sides of the central position, and the required crowning is obtained.

Fig. 28 also shows a further feature desired in some instances, as described above, namely, means for changing the timing at a constant or varying rate.

The workpiece 251 is driven through a worm 252 and worm gear 253 from a conventional timing train. This train contains change gears 254 and a differential 260. Differential 260 comprises the bevel gears 261 and a planet carrier 262. The latter is driven through change gears in conventional hobbing machines. To attain a timing change of any desired nature, I substitute a cam drive, including a cam 265, for the change gears. Cam 265 engages a roller 264 rotatably mounted on the planet carrier 262. Thereby any desired varying motion is imparted to the planet carrier, thereby varying in desired fashion the timing of the rotations of the hob 233 and the work 251.

Fig. 29 illustrates a substitute mechanism 272 which may be substituted for the differential 260 of Fig. 28, the two coaxial, opositely-threaded shafts 270 and 271 replacing the two coaxial shafts of the differential. A simple rotary disc cam 277 may be used on this substitute.

The shafts 270, 271 are rotatably mounted in an axially fixed position and contain helical splines 273, 274 of opposite hand that are engaged respectively by the oppositely-splined ends of a sleeve member 275. This member has internal splines or teeth matching the splines 273, 274. The sleeve member 275 is rotatably journaled in an axially fixed position in a slide 276 that is movable in the direction of the shafts 270, 271. Displacement of the slide 276 moves the slide member 275 axially and turns the two shafts 270, 271 relative to each other. Such displacement is effected by the cam 277 (Figs. 29 and 30) rigidly secured to an arm 278 of a shaft 280 that is equivalent of the shaft of cam 265 of Fig. 28. Cam 277 may be rotated at a constant rate in the usual manner by change gears in time with the hob feed.

The cam 277 engages a roller 281 mounted on a part 282 which is rigidly secured to the slide 276. Engagement between the cam and the roller is maintained by conventional means (not shown) such as by hydraulic pressure.

The cam 277 and roller 281 are shown in Fig. 30 which is a view along the cam axis. The position shown corresponds to the mid position of the hob feed. In this position, the curvature center 283 of the cam profile 284 at the point of contact 285 lies on the axis of rotation of the cam. The cam profile 284 has a varying curvature, and may be, for instance, an eccentric involute whose base circle is tangent to the normal 283–285 and passes through point 283. Rotation of the cam from the position shown displaces the roller 281 and slide 276 at first very slowly and then at a gradually increasing rate, as required.

The effect can be intensified or reduced by changing the ratio of the gears that drive the cam 277. A modified effect at the ends of the teeth can be attained by changing the diameter of the roller. Thus, the roller 281' (Fig. 30) might be substituted for the roller 281. To this end, part 282 is adjustable on slide 276 in the direction of the slide motion so that the same cam may be used with different roller diameters.

Which way to move the slide 276 along the shafts 270, 271, and how much to move it, may be determined experimentally or by computation.

We may define the additional feed motion by the direction of the resultant feed motion with respect to a stationary work piece. The resultant motion is made up of the motion along the feed path and of the additional motion due to the timing change. To compensate for the circular translation of a hob set to its lead angle, the hob is fed relative to the workpiece in a somewhat changing direction. In the middle portion the hob is fed straight, that is, in a direction of its lead angle to which it is set. Adjacent both end portions it is fed in a direction of a somewhat increased lead angle. This moves the hob away from the tooth portions where too much stock would be removed and toward the tooth portions where too much stock would be left without the correcting motion. In this way exactly symmetrical tooth surfaces can be obtained.

While the invention has been described in connection with several different embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of producing the crowned external member of a toothed coupling, which comprises rotating a threaded tool member and a rotatable work piece on their respective axes in engagement and in timed relation to each other, effecting curved feeding motion between said tool member and work piece in an axial plane of the work piece so that the tool member describes a path concave toward the work piece while relatively moving from one end face of the work piece to the other, and changing the relationship between said tool member and work piece at a continuously varying rate during said feeding motion, to approach the working portions of said tool member towards one side of the teeth of said work piece during part of said feeding motion and towards the other side of said teeth during another part of said feeding motion.

2. The method of producing the crowned external member of a toothed coupling, which comprises rotating a threaded tool member and a rotatable work piece on their respective axes in engagement and in timed relation to each other, effecting curved feeding motion between said tool member and work piece in an axial plane of the work piece so that the tool member describes a path concave toward the work piece while relatively moving from one end face of the work piece to the other, and changing the relationship between said tool member and work piece during said feeding motion at a varying rate that is larger at the ends of said feeding motion than at its middle, to approach the working portions of said tool member towards one side of the teeth of said work piece during part of said feeding motion and towards the other side of said teeth during another part of said feeding motion.

3. The method of producing the crowned external member of a toothed coupling, which comprises rotating a threaded tool member and a rotatable work piece on their respective axes in engagement and in timed relation to each other, effecting curved feeding motion between said tool member and work piece in an axial plane of the work piece, and changing the rotational timing between said tool member and work piece at a continuously varying rate during said feeding motion.

4. The method of producing the crowned external member of a toothed coupling, which comprises rotating a threaded tool member and a rotatable work piece on their respective axes in engagement and in timed relation with each other, effecting curved feeding motion between said tool member and work piece in an axial plane of the work piece, and changing the rotational timing between said tool member and work piece at a varying rate during said feeding motion, said rate being larger at the ends of said feeding motion than at its middle.

5. The method of producing the crowned external member of a toothed coupling, which comprises rotating a threaded tool member, which is of larger outside diameter at its ends than at its middle, and which has working portions lying in a thread side of larger inclination to its radii than the mean inclination depthwise of the tooth sides of said external member, in engagement with a work piece while rotating the work piece on its axis in timed relation with the rotation of the tool member, and effecting feeding motion between said tool member and work piece in a curved relative path.

6. The method of producing one side of the teeth of the crowned external member of a gear coupling, which comprises rotating a hob, which has cutting edges lying in a thread side of larger inclination to its radii than the mean inclination depthwise of the tooth sides of said external member, and which has a larger outside diameter at one end of said thread side than at the other end of said thread side, in engagement with a work piece while rotating the work piece on its axis in timed relation with the rotation of the tool member, and effecting feeding motion between said hob and work piece in a curved relative path.

7. The method of producing the crowned external member of a toothed coupling, which comprises providing a threaded tool member composed of two oppositely tapered parts rigidly connected with each other and having their small ends facing each other, the two side surfaces of a thread of each of said parts consisting of an outside surface facing the large end of said part and of an inside surface facing its small end, rotating said tool member and a work piece on their respective axes in engagement and in timed relation with each other, and effecting feeding motion between said tool member and work piece in a curved relative path with said outside surfaces of the two parts in finishing engagement with opposite sides of the teeth of the work piece.

8. The method of producing the crowned external member of a toothed coupling, which comprises providing a threaded tool member composed of two oppositely tapered parts rigidly connected with each other and having their small ends facing each other, the two side surfaces of a thread of each of said parts consisting of an outside surface facing the large end of said part and of an inside surface facing its small end, said outside surface being an involute helicoid approximately and having a constant pitch, rotating said tool member and a work piece on their respective axes in timed relation with each other, and effecting feeding motion between said tool member and work piece about a center lying on the axis of said work piece with said outside surfaces of said two parts in finishing engagement with opposite sides of the teeth of the work piece.

9. The method of producing the crowned external member of a toothed coupling, which comprises rotating a threaded tool member in engagement with a work piece in timed relation with the work piece with the axis of said tool member at right angles to the direction of the axis of the work piece, effecting feeding motion between said tool member and work piece in a curved path lying in an axial plane of the work piece, and continuously changing the rotational timing between said tool member and work piece in accordance with the curvature of said path.

10. A machine for hobbing toothed coupling members, comprising a rotary tool support, a rotary work support, means for rotating said tool and work supports on their respective axes in timed relation, means for effecting relative movement between said supports in a direction axial of said work support in time with the rotation of said tool and work supports, a swing part and abutment for effecting a relative feed motion between the tool and work supports depthwise of the work in time with the rotation of said tool and work supports, means for turning said swing part through a fraction of a turn per cutting cycle, and means for varying the timing of the rotations of the tool and work supports during their rotation.

11. The method of producing the externally toothed member of a gear coupling, which comprises positioning a rotary tool member, which has its working portions disposed in a single thread of several convolutions, with its axis at right angles to the direction of the axis of a rotatable workpiece, rotating said tool member and workpiece on their respective axes in engagement and in timed relation to each other, effecting curved feeding motion between said tool member and workpiece in an axial plane of the workpiece while maintaining the axis of said tool member at right angles to the axis of the workpiece, and changing the rotational timing between said tool member and workpiece continuously during said feeding motion.

12. The method according to claim 11, wherein said feeding motion is along a circular arc centered on the axis of the workpiece, and wherein the tool member is a tapered tool member whose opposite thread profiles have different inclinations to its radii and wherein the tooth sides of the workpiece are produced with the thread side of larger profile inclination.

13. A machine according to claim 10, wherein means are provided for turning the swing part in direct proportion to the feed movement axially of the work support, the last-named means including change gears for providing different angles of swing for different applications.

14. A machine for producing toothed coupling members with threaded tool members, comprising a rotary tool support, a rotary work support, means for rotating said tool and work suppports on their respective axes in timed relation, means for effecting feeding motion between said tool and work supports in a curved path lying in an axial plane of said work support, said path being concave towards the axis of said work support, and means for changing the rotational timing between said supports in direct proportion to the arc travelled on said path.

15. A machine for producing toothed coupling members with threaded tool members, comprising a rotary tool support, a rotary work support, means for rotating said tool and work supports on their respective axes in timed relation, means for effecting feeding motion between said tool and work supports in a curved path lying in an axial plane of said work support, said path being concave towards the axis of said work support and having a main component axially of said work support and a smaller component at right angles thereto, and means for changing the rotational timing between said supports at a varying proportion to said axial component.

16. A machine for producing toothed coupling members with threaded tool members, comprising a rotary tool support, a rotary work support, a timing train for rotating said tool and work supports on their respective axes in timed relation, means for effecting feeding motion between said tool and work supports in a curved path concave towards the axis of said work support and having a main component axially of said work support and a smaller component at right angles thereto, a pair of coaxial parts disposed in said timing train, movable means for operatively connecting said parts, and cam means for controlling the displacement of said movable means.

17. A machine for producing toothed coupling members with threaded tool members, comprising a rotary tool support, a rotary work support, a timing train for rotating said tool and work supports on their respective axes in timed relation, means for effecting feeding motion between said tool and work supports in a curved path concave towards the axis of said work support and having a main component axially of said work support and a smaller component at right angles thereto, a differential in said timing train, said differential having three relatively movable coaxial elements, namely two sun gears and a planet carrier, two of said elements being secured to opposite adjacent ends of said timing train, and means for imparting motion to the third of said elements at a varying proportion to one of said two elements, said means comprising cam means for at least partly controlling said motion.

References Cited in the file of this patent

UNITED STATES PATENTS

| | | |
|---|---|---|
| 1,677,853 | Schurr | July 17, 1928 |
| 1,833,227 | Olsen | Nov. 24, 1931 |
| 2,472,644 | Barcus | June 7, 1949 |
| 2,473,709 | Hitchcock | June 21, 1949 |
| 2,483,810 | Cotta | Oct. 4, 1949 |
| 2,511,964 | Boor | June 20, 1950 |
| 2,542,546 | Mackmann et al. | Feb. 20, 1951 |
| 2,629,290 | Staples et al. | Feb. 24, 1953 |
| 2,682,760 | Shenk | July 6, 1954 |
| 2,687,025 | Wildhaber | Aug. 24, 1954 |
| 2,744,449 | Belden et al. | May 8, 1956 |
| 2,757,577 | Bean et al. | Aug. 7, 1956 |